Patented June 11, 1929.

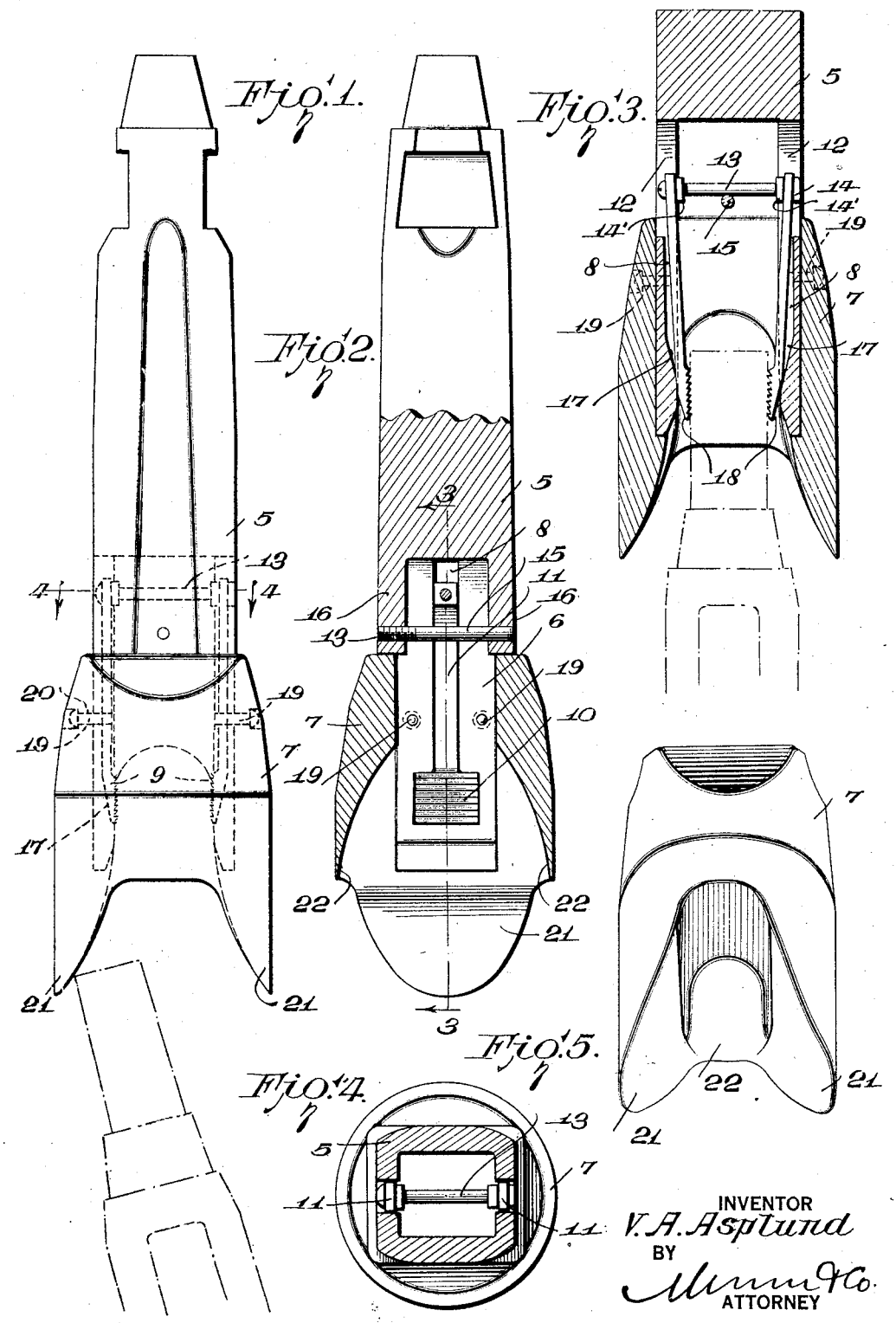

1,717,300

UNITED STATES PATENT OFFICE.

VIO A. ASPLUND, OF MINOT, NORTH DAKOTA.

WELL FISHING TOOL.

Application filed January 17, 1928. Serial No. 247,427.

My invention relates to well fishing tools, and one of its objects is to provide a device of this character whereby a broken bit or other well working tool may be readily fished from the well regardless of the position the broken part lies in the well.

More specifically, the invention provides a fishing tool embodying a plurality of various sized bells or sockets, any one of which may be employed for the fishing operation according to the diameter of the well.

With the preceding and other objects and advantages in mind, the invention consists in the combination of elements, constructions and arrangement of parts and operations to be hereinafter specifically referred to, claimed, and illustrated in the accompanying drawings wherein:—

Figure 1 is a side elevation of a well fishing tool constructed in accordance with the invention, Figure 2 is a vertical sectional view of the same, Figure 3 is a similar view taken at right angles to Figure 2, illustrating the device engaged with a well drill tool, the tool being shown in dot and dash outline, Figure 4 is a transverse section on line 4—4 of Figure 1, and Figure 5 is a perspective of one of the bells or sockets.

Referring to the invention in detail, a stock or shank 5 terminating in a pair of parallel arms 6 at its lower end to receive a bell or lost tool receiving socket 7 is provided.

Normally lying within transversely alined longitudinally extending grooves 8 in the arms are co-acting oppositely movable jaws 9 having ribs or serrations 10 upon their engaging faces. Each of the jaws is formed with a shank 11 which is also slidable in the grooves and longitudinal slots 12 in the arms, the former communicating with the upper ends of the grooves. At their upper ends, a bolt 13 passes transversely through the shanks and receives a retaining nut 14 on one end. Stop nuts 14' are also arranged on the bolt to retain the shanks in spaced relation.

To limit the downward movement of the jaws, a stop pin 15 carried by an extension 16 on the stock above the arms extends at right angles to the bolt below the same and is engageable by the latter when the jaws frictionally engage the object to be lifted from the well.

To actuate the jaws into gripping engagement with the object, bevelled surfaces 17 are formed upon the base walls of the grooves at their lower ends over which bevelled surfaces 18 on the inner faces of the jaws rise, and thereby force the jaws into gripping engagement with the object incident to the weight of the latter when the device is lifted.

The bell or socket is provided with a rectangular bore to receive the parallel arms and is retained thereon by removable fastenings 19 passing through registering openings 20 in the side walls of the bell and the arms.

At its lower end, the bell is formed with a pair of bevelled extensions 21 which guide the lost tool or object within the bell while the walls of the latter gradually decrease in thickness towards their lower edges as indicated at 22 to facilitate the entrance of the object between the jaws.

In practice, a plurality of these bells or sockets are provided, each of which is of a different diameter so that the device may be used in fishing drills or other objects forming wheels of various diameters. However, the construction of the bells are identical and any one of which may be readily interchanged for another.

What is claimed is:

1. In a well fishing tool, a stock, a pair of parallel arms carried by one end thereof and having inclined grooves in their opposed faces, gripping elements slidable in the grooves and having bevelled faces adapted to ride over the inclined grooves whereby the gripping elements are forced laterally towards each other to grip an object, and a bell received on the arms for guiding objects to be fished from a well into position between the gripping elements.

2. In combination, a stock having parallel arms provided with longitudinal grooves in their opposed faces which are bevelled at one end, gripping elements arranged in the bevelled ends of the grooves and forced laterally into gripping position by slidable movement over the latter, shanks formed with the gripping elements and slidable in the grooves, and a connection between the shanks.

3. In combination, a stock having parallel arms provided with longitudinal grooves in their opposed faces which are bevelled at one end, gripping elements arranged in the bevelled ends of the grooves and forced laterally into gripping position by slidable movement over the latter, shanks formed with the gripping elements and slidable in the grooves, a connection between the shanks, and a bell received on the arms.

4. In a well fishing tool, a stock having parallel arms at one end provided with longitudinal grooves and communicating slots, gripping elements slidable in the grooves and having shanks movable in the slots, a rigid connection between the shanks and passing through the slots, and a stop pin carried by the stock and engageable with the connection to limit the movement of the jaws in one direction.

Signed at Minot, in the county of Ward and State of North Dakota, this 29th day of October A. D. 1927.

VIO A. ASPLUND.